United States Patent
Moon et al.

(10) Patent No.: US 7,027,119 B2
(45) Date of Patent: Apr. 11, 2006

(54) TRANSMISSIVE LIQUID CRYSTAL DISPLAY DEVICE HAVING A CHOLESTERIC LIQUID CRYSTAL COLOR FILTER AND METHOD OF FABRICATING THE SAME

(75) Inventors: Jong-Weon Moon, Annyang-si (KR); Jae-Hong Hur, Annyang-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 67 days.

(21) Appl. No.: 10/878,400

(22) Filed: Jun. 29, 2004

(65) Prior Publication Data

US 2005/0007523 A1    Jan. 13, 2005

(30) Foreign Application Priority Data

Jul. 8, 2003   (KR) ...................... 10-2003-0045991

(51) Int. Cl.
   *G02F 1/1335*   (2006.01)

(52) U.S. Cl. ..................... 349/115; 349/109; 349/106
(58) Field of Classification Search ................ 349/115, 349/106–109
See application file for complete search history.

(56) References Cited

U.S. PATENT DOCUMENTS

| | | | | | |
|---|---|---|---|---|---|
| 5,822,029 | A | * | 10/1998 | Davis et al. | 349/115 |
| 6,025,899 | A | * | 2/2000 | Fukunaga et al. | 349/115 |
| 6,597,418 | B1 | * | 7/2003 | Moon et al. | 349/98 |
| 6,900,864 | B1 | * | 5/2005 | Iino | 349/115 |
| 6,909,485 | B1 | * | 6/2005 | Yoon et al. | 349/123 |
| 6,937,305 | B1 | * | 8/2005 | Lee | 349/115 |

* cited by examiner

*Primary Examiner*—Toan Ton
(74) *Attorney, Agent, or Firm*—McKenna Long & Aldridge LLP

(57) ABSTRACT

A liquid crystal display device of the present invention includes: first and second substrates including a plurality of pixels, wherein each pixel divided into first to third sub-pixels; a double-layered cholesteric liquid crystal color filter (CCF) layer over the first substrate, the double-layered CCF layer including a first CCF layer including first and second CCF with a ratio of 1:2 in size and a second CCF layer including third and fourth CCF with a ratio of 2:1 in size; a first transparent electrode on the double-layered CCF layer; a second transparent electrode on the second substrate; a liquid crystal layer between the first and second transparent electrodes; and a backlight device adjacent to the first substrate and emitting light toward the first and second substrates.

18 Claims, 8 Drawing Sheets

*FIG. 7* ized color filter.

TRANSMISSIVE LIQUID CRYSTAL DISPLAY DEVICE HAVING A CHOLESTERIC LIQUID CRYSTAL COLOR FILTER AND METHOD OF FABRICATING THE SAME

This application claims the benefit of Korean Patent Application No. 2003-0045991, filed on Jul. 8, 2003, which is hereby incorporated by reference for all purposes as if fully set forth herein.

BACKGROUND OF THE INVENTION

1. Field of the Invention

The present invention relates to a liquid crystal display device, and more particularly to a transmissive liquid crystal display device using a cholesteric liquid crystal color filter layer.

2. Discussion of the Related Art

Liquid crystal display (LCD) devices with light, thin, and low power consumption characteristics are used in office automation equipment, video units and the like. Such LCDs typically use a liquid crystal (LC) interposed between upper and lower substrates with an optical anisotropy. Because the LC has thin and long LC molecules, the alignment direction of the LC molecules can be controlled by applying an electric field to the LC molecules. When the alignment direction of the LC molecules is properly adjusted, the LC is aligned and light is refracted along the alignment direction of the LC molecules to display images.

In general, LCD devices are divided into transmissive LCD devices and reflective LCD devices based upon whether the display device uses an internal or external light source.

A related art LCD device includes an array substrate, a color filter substrate, and a liquid crystal interposed between the array and color filter substrates. In general, voltages are applied to two electrodes which are formed on the array and color filter substrates, respectively, whereby an electric field generated between the two electrodes moves and arranges molecules of the liquid crystal. In order to display images in the LCD device, light should pass through the liquid crystal. Therefore, a backlight device is required to generate the light to pass through the liquid crystal.

A related art LCD device has an LCD panel and a backlight device. The incident light from the backlight is attenuated during the transmission so that the actual transmittance is only about 7%. A transmissive LCD device requires a high, initial brightness light source, and thus electrical power consumption by the backlight device increases. A relatively heavy battery is needed to supply sufficient power to the backlight of such a device, and the battery can not be used for a lengthy period of time.

In order to overcome the problems described above, a reflective LCD has been developed. Because the reflective LCD device uses ambient light instead of the backlight by using a reflective opaque material as a pixel electrode, the reflective LCD may be light and easy to carry. In addition, the power consumption of the reflective LCD device may be reduced so that the reflective LCD device can be used as an electric diary or a PDA (personal digital assistant).

However, the reflective LCD device is affected by its surroundings. For example, the brightness of ambient light in an office differs largely from that of the outdoors. Therefore, the reflective LCD device can not be used where the ambient light is weak or does not exist. Furthermore, the reflective LCD device has a problem of poor brightness because the ambient light passes through the color filter substrate and is reflected toward the color filter substrate by a reflector on the array substrate. Namely, because the ambient light passes through the color filter substrate twice, the reflective LCD device has a low light transmissivity and thus, poor brightness.

In order to overcome the above-mentioned problem, it is necessary to improve the transmittance of the color filter. To improve the transmittance, the color filter needs to have low color purity. However, a limitation is encountered when lowering the color purity because it is difficult to form a color filter thickness under a critical margin using a color resin. Accordingly, an LCD device having a layer for selectively reflecting and transmitting light is being researched and developed.

In general, liquid crystal molecules have a specific liquid crystal phase based on their structure and composition. The liquid crystal phase is affected by temperature and concentration. The most common liquid crystal is nematic liquid crystal in which the molecules of liquid crystal are oriented in parallel lines in one direction. The nematic liquid crystal has been extensively researched and developed and applied to various kinds of liquid crystal display devices.

Recently to improve the operating characteristics (such as brightness) of the transmissive LCD device, a cholesteric liquid crystal (CLC), which selectively transmits or reflects light with a specific color, has been studied and developed. The CLC usually has liquid crystal molecules whose axes are twisted or includes chiral stationary phase molecules and nematic liquid crystal molecules that are twisted by the chiral stationary phase molecules. In general, the nematic liquid crystal has a regular arrangement in parallel to one another, while the cholesteric liquid crystal has a multi-layered structure. The regular arrangement of nematic liquid crystal appears in each layer of the cholesteric liquid crystal.

Furthermore, the CLC has a helical shape and the pitch of the CLC is controllable. Therefore, the CLC color filter can selectively transmit or/and reflect the light. In other words, as is well known, all objects have an intrinsic wavelength, and the color that an observer recognizes is the wavelength of the light reflected from or transmitted through the object. The wavelength ($\lambda$) of the light reflected by the CLC can be represented by the following formula, which is a function of pitch and average refractive index of CLC: $\lambda = n(avg) \cdot pitch$, where $n(avg)$ is the average index of refraction. For example, when the average refractive index of CLC is 1.5 and the pitch is 430 nm, the wavelength of the reflected light is 645 nm and the reflective light becomes red. In this manner, the green color and the blue color also can be obtained by adjusting the pitch of the CLC.

In other words, the wavelength range of visible light is about 400 nm to 700 nm. The visible light region can be broadly divided into red, green, and blue regions. The wavelength of the red visible light region is about 660 nm, that of green is about 530 nm, and that of blue is about 470 nm. Due to the pitch of the cholesteric liquid crystal, the CLC color filter can selectively transmit or reflect light having the intrinsic wavelength of the color corresponding to each pixel thereby clearly displaying the colors of red (R), green (G) and blue (B) with a high purity. In order to implement a precise color, a plurality of the CLC color filters can be arranged, to display the full color more clearly than a color filter of the related art. The cholesteric liquid crystal (CLC) color filter will be referred to as CCF herein after.

Figure 1:
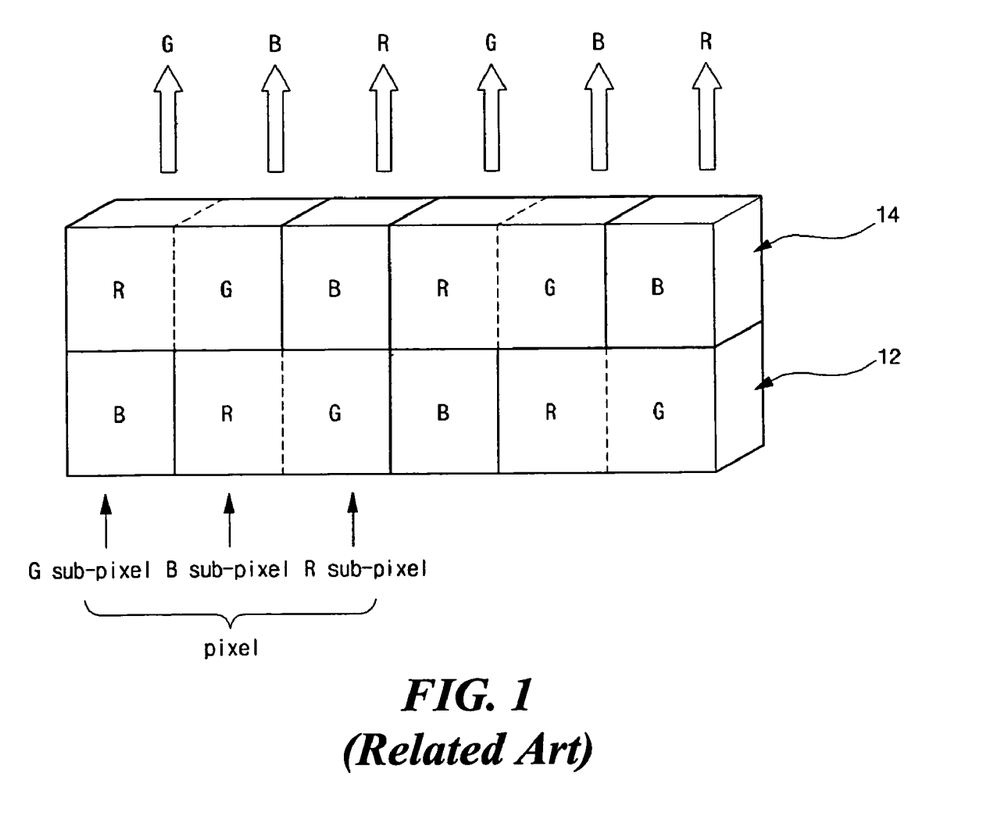
FIG. 1 shows a conceptual arrangement of the cholesteric liquid crystal color filters (CCFs) according to a related art.

FIG. 1 shows a conceptual arrangement of the cholesteric liquid crystal color filters (CCFs) according to a related art. When the CCFs are used for the color filter substrate of the LCD device, red (R), green (G) and blue (B) sub-pixels constitute one pixel. Therefore, the R, G and B sub-pixels are in the ratio of 1:1:1 within one pixel. Namely, the R, G and B CCFs have the same size when they are applied to the related art color filter substrate. Furthermore, two of the R, G and B CCFs are accumulated and formed in each sub-pixel to produce the other one of the red, green and blue colors.

In FIG. 1, a first CCF layer 12 and a second CCF layer 14 are formed in series over a substrate (not shown) where the plurality of R, G and B sub-pixels are defined. The first CCF layer 12 has red (R), green (G) and blue (B) CCFs in an alternate order, and the second CCF layer 14 also alternately has red (R), green (G) and blue (B) CCFs. In the red (R) sub-pixel that produces the red color, the G and B CCFs are disposed. Additionally, the R and G CCFs are disposed in the blue (B) sub-pixel, and the R and B CCFs are disposed in the green (G) sub-pixel.

In the R sub-pixel, the green (G) CCF of the first CCF layer 12 selectively reflects green-colored light and transmits red- and blue-colored light. Thereafter, the blue-colored light is reflected by the blue (B) CCF of the second CCF layer 14 in the R sub-pixel. As a result, only the red-colored light transmits the blue (B) CCF of the second CCF layer 12, and then the R sub-pixel can produce the red color. In this manner, the other blue and green colors can be produced in the B and G sub-pixels, respectively.

According to the related art, one pixel has the R, G and B sub-pixels each having double-layered CCF layers. Furthermore, the sizes of the R, G and B CCFs are the same with the ratio of 1:1:1. However, such ratio of 1:1:1 has some disadvantages.

Figure 2:
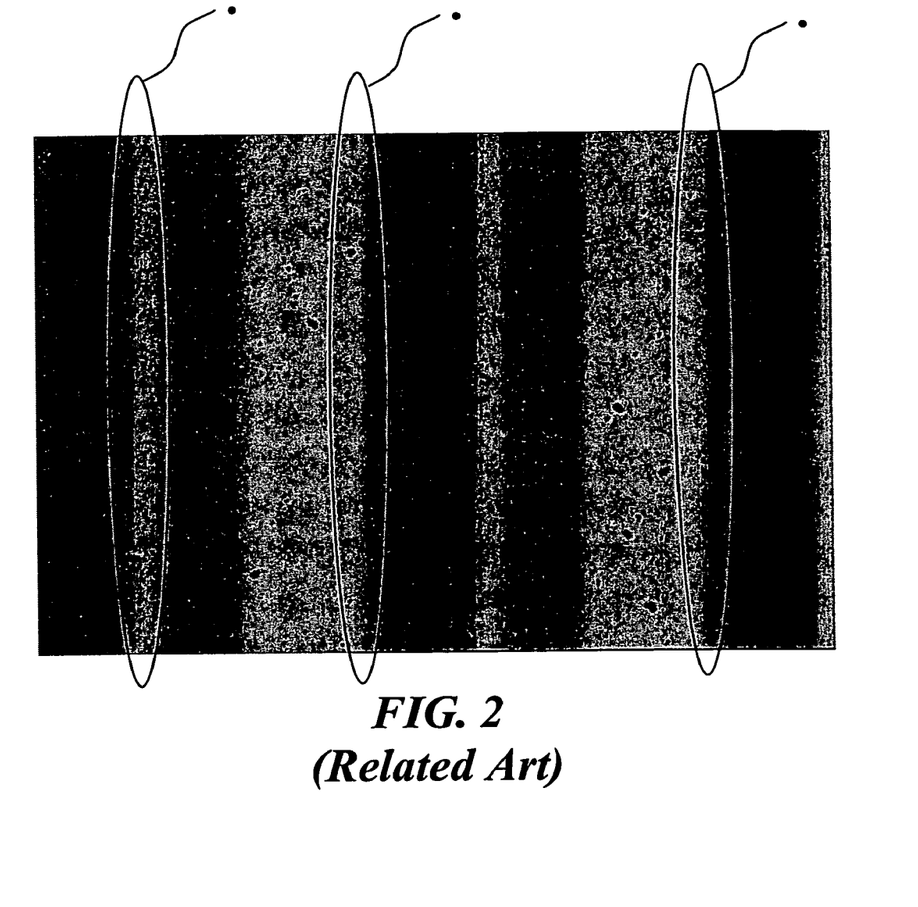
FIG. 2 shows CLC color filters of the transmissive LCD device after pixelating the R, G and B CCFs in the ratio of 1:1:1 according to a related art.

FIG. 2 shows CLC color filters of the transmissive LCD device after pixelating the R, G and B CCFs in the ratio of 1:1:1 according to a related art. As shown, red, green and blue sub-pixels SP are disposed in an alternate order. However, a color mixture occurs in borders B among the R, G and B CCFs. The reason of the color mixture may be caused by the misalignment of R, G and B CCFs, or by the light leakage during the formation of the CCFs. When forming the R, G and B CCFs, a mask is disposed over the cholesteric liquid crystal (CLC) layer and then the light exposure is performed on the CLC layer. At this time, the exposure light diffuses and affects the other portions for CCFs, whereby abnormally exposed portions exist in the borders B among the red, green and blue CCFs.

Figure 3:
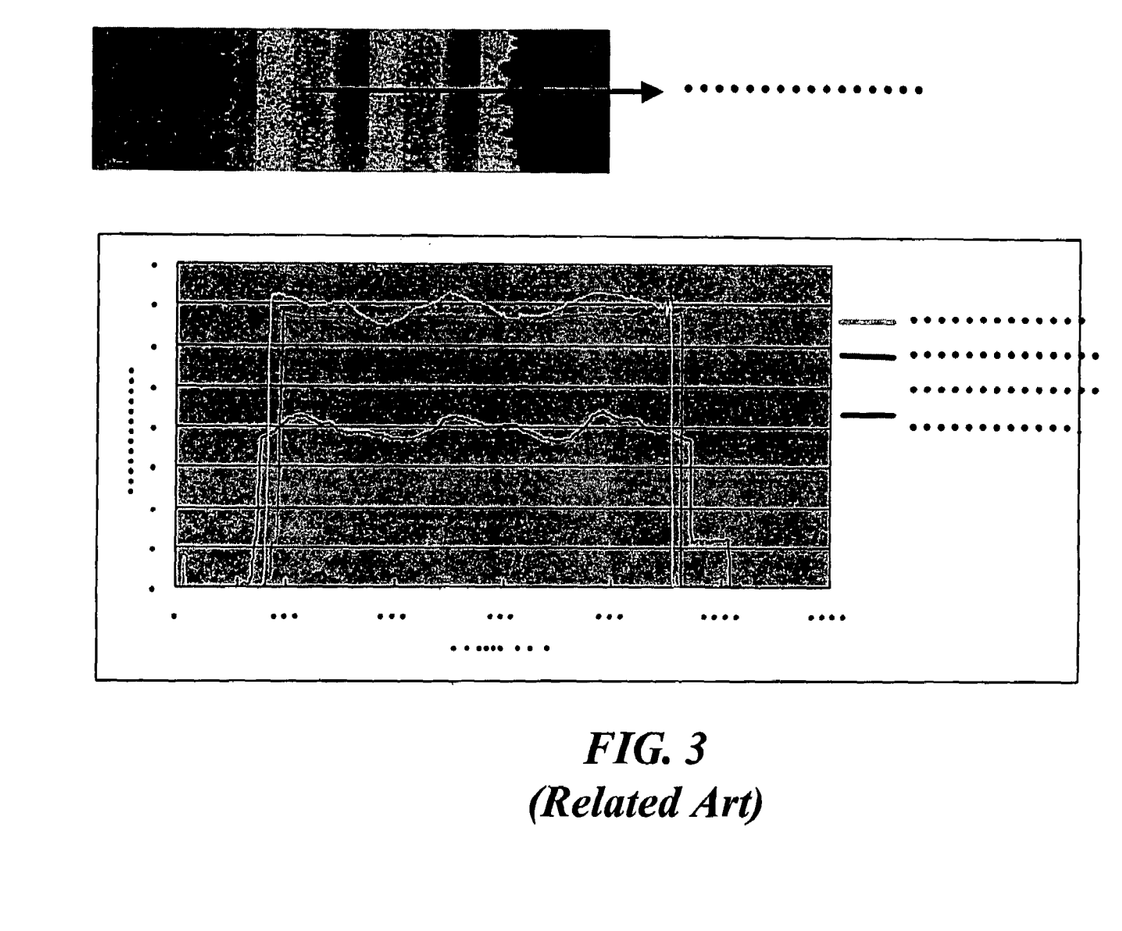
FIG. 3 is a graph showing the thickness difference of the cholesteric liquid crystal color filters according to the related art.

Moreover, there are some other problems when forming the R, G and B CCFs in the ratio of 1:1:1. The cholesteric liquid crystal (CLC) layer becomes the R, G and B CCFs depending on how much and how long it is exposed to the light. The primary CLC layer is formed with uniform thickness over the substrate, but the formed R, G and B CCFs have the different thickness due to the amount of the light for exposure. In general, the G CCF is thicker than the B CCF by 0.25 micrometers, and the R CCF is thicker than the G CCF by 0.25 micrometers. Namely, the CCF layer including the R, G and B CCFs may have the maximum thickness difference of 0.5 micrometers in the pixel. Such thickness difference is shown in the graph of FIG. 3. When the steps (i.e., the thickness differences) exist in the CCF layer, they lead to the different cell gaps in the pixel between the color filter substrate and the array substrate, thereby bringing about a result of retardation difference. Referring back to FIG. 1, the second CCF layer 14 may planarize the surface of the first CCF layer 12, but second CCF layer 14 also has the thickness difference (the step) among the R, G and B CCFs because it is also fabricated by the light exposure.

SUMMARY OF THE INVENTION

Accordingly, the present invention is directed to a CCF (cholesteric liquid crystal color filter) type transmissive liquid crystal display device that substantially obviates one or more of the problems due to limitations and disadvantages of the related art.

An advantage of the present invention is to provide a CCF type transmissive liquid crystal display device that does not have a color mixture in borders among the CCFs.

Another advantage of the present invention is to provide a CCF type transmissive liquid crystal display device that has an improved color display.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes: first and second substrates including a plurality of pixels, wherein each pixel divided into first to third sub-pixels; a double-layered cholesteric liquid crystal color filter (CCF) layer over the first substrate, the double-layered CCF layer including a first CCF layer including first and second CCF with a ratio of 1:2 in size and a second CCF layer including third and fourth CCF with a ratio of 2:1 in size; a first transparent electrode on the double-layered CCF layer; a second transparent electrode on the second substrate; a liquid crystal layer between the first and second transparent electrodes; and a backlight device adjacent to the first substrate and emitting light toward the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, example of which is illustrated in the accompanying drawings. Wherever possible, the same reference numbers will be used throughout the drawings to refer to the same or like parts.

Figure 4A:
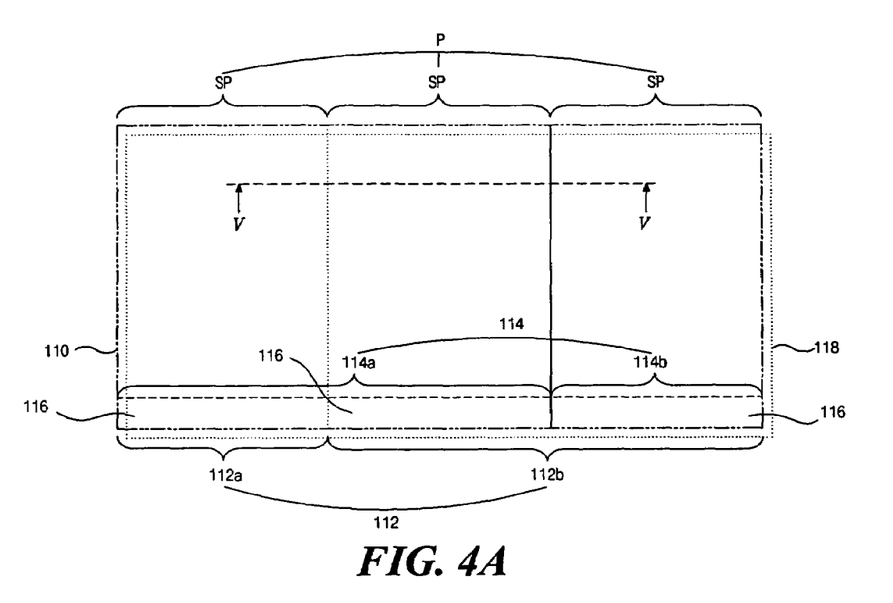
FIG. 4A is a plan view illustrating a color filter substrate having the cholesteric liquid crystal color filter according to the present invention.
Figure 4B:
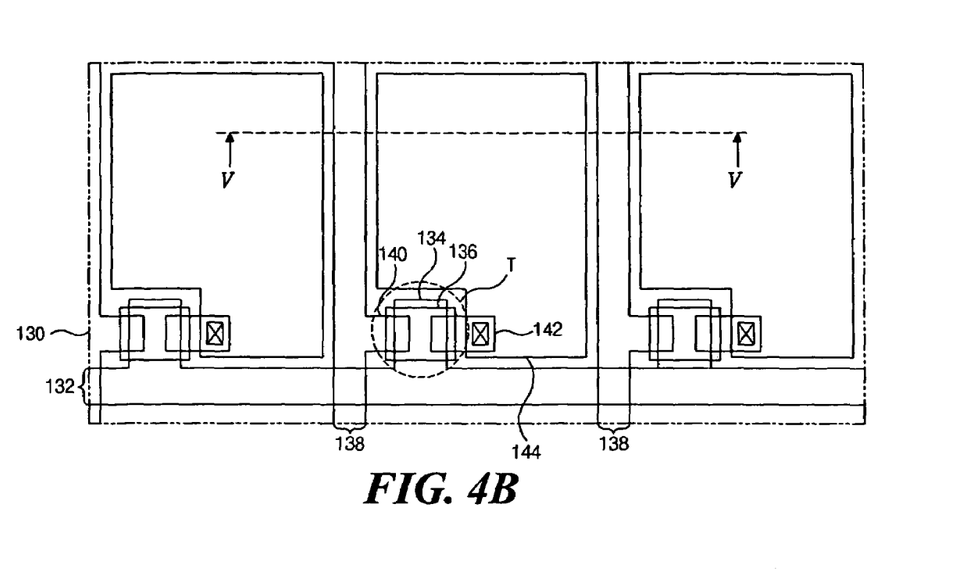
FIG. 4B is a plan view illustrating an array substrate according the present invention.

FIG. 4A is a plan view illustrating a color filter substrate having the cholesteric liquid crystal color filter according to the present invention, and FIG. 4B is a plan view illustrating an array substrate according the present invention.

In FIG. 4A, a pixel P including three sub-pixels SP is defined on a first substrate 110. The three sub-pixels SP have the same size at the ratio of 1:1:1. And a double-layered cholesteric liquid crystal color filter (CCF) layer 116 including first and second CCF layers 112 and 114 is formed on the fist substrate 110. Although the sub-pixels SP have the same size in the ratio of 1:1:1, two of the sub-pixels SP have the same colored CCFs 112*b* or 114*a* and the other one sub-pixel SP has different colored CCF 112*a* or 114*b*. Therefore, the ratio of the CCFs in the pixel P is 2:1, in contrast to the related art. The detailed description about such CCF structure will be explained with reference to FIG. 5. Meanwhile, a common electrode 118 is formed on the double-layered CCF layer 116.

FIG. 4B shows the array substrate that is an opposite substrate to the color filter substrate. As shown, a gate line 132 is disposed in a first direction on a second substrate 130. A data line 138 is disposed in a second direction on the second substrate 130 and crosses substantially perpendicular to the gate line 132. Pairs of the gate and data lines 132 and 138 define regions for the sub-pixels SP. Near the crossing of the gate and data lines 132 and 138, a thin film transistor T is formed that includes a gate electrode 134, a semiconductor layer 136, a source electrode 140 and a drain electrode 142. The gate electrode 134 extends from the gate line 132, and the source electrode 140 extends from the data line 138. The drain electrode 142 is spaced apart from the source electrode 140 across the gate electrode 134. The semiconductor layer 136 is disposed in a portion between the source and drain electrodes 140 and 142. A pixel electrode 144 is disposed in the sub-pixel region and contacts the drain electrode 142 of the thin film transistor T.

Figure 5:
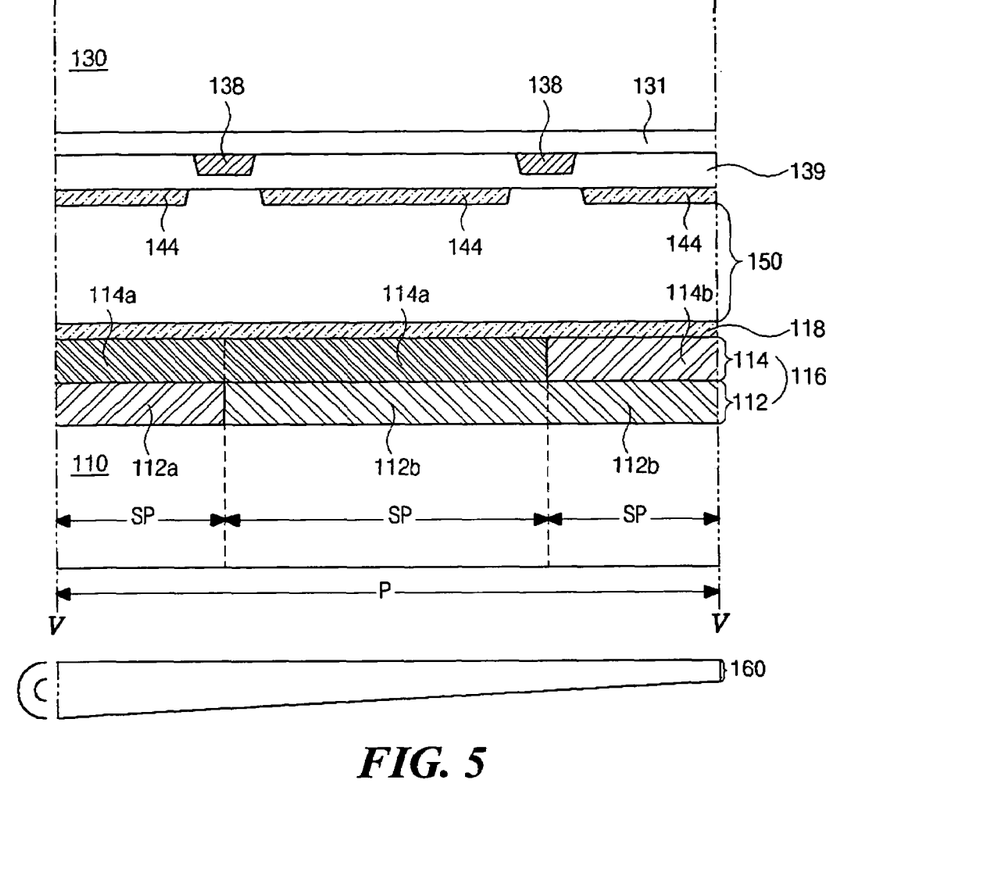
FIG. 5 is a cross sectional view taken along line V—V of FIGS. 4A and 4B when the array and color filter substrates are attached to each other according to the present invention.

FIG. 5 is a cross sectional view taken along line V—V of FIGS. 4A and 4B when the array and color filter substrates are attached to each other according to the present invention. As shown, the first and second substrates 110 and 130 are spaced apart from and face towards each other. The first and second substrates 110 and 130 include the pixel P that is divided into three sub-pixels SP. The double-layered CCF layer 116 is disposed on the first substrate 110. As described hereinbefore, the double-layered CCF layer 116 includes the first CCF layer 112 on the first substrate 110 and the second CCF layer 114 on the first CCF layer 112. The first CCF layer 112 includes a first CCF 112*a* that occupies one sub-pixel SP and a second CCF 112*b* that occupies the other two sub-pixels SP, while the second CCF layer 114 includes a third CCF 114*a* that occupies two sub-pixels SP and the fourth CCF 114*b* that occupies the only other one sub-pixel SP. The first and fourth CCFs 112*a* and 114*b*, which are located within only one sub-pixel SP, may have the same color, and the second and third CCFs 112*b* and 114*a* may have the colors different from each other and from the color of the first and fourth CCFs 112*a* and 114*b*. Within one sub-pixel SP, especially in the middle one of FIG. 5, the third CCF 114*a* occupying two sub-pixels overlaps the second CCF 112*b* that also occupies two sub-pixels.

Therefore, the first and second CCFs 112*a* and 112*b* of the first CCF layer 112 are in the ratio of 1:2 within the pixel P. Additionally, the third and fourth CCFs 114*a* and 114*b* of the second CCF layer 114 are in the ratio of 2:1 within the pixel P. If the first CCF 112*a* of the first CCF layer 112 represents a blue (B) color and if the second CCF 112*b* of the first CCF layer 112 represents a red (R) color, the ratio of blue (B) to red (R) will be 1 to 2 (1:2). Then if the third CCF 114*a* of the second CCF layer 114 represents a green (G) color and if the fourth CCF 114*b* of the second CCF layer 114 represents a blue (B) color, the ratio of green (G) to blue (B) will be 2 to 1 (2:1). In the present invention, each of the first and second CCF layers 112 and 114 only includes two CCFs; B and R, R and G or G and B, unlike the related art. And the combination of B and R, R and G or G and B will produce R, G or B color. Accordingly, in the present invention, because two sub-pixels SP of the pixel P have the same-color-representing CCF, no thickness difference (the step) in the CCFs is shown in between those two sub-pixels in contrast to the related art.

Still referring to FIG. 5, a first insulating layer 131 is formed on a rear surface of the second substrate 130, and the data lines 138 are disposed under the first insulating layer 131. Each of the data lines 138 corresponds to a border between the sub-pixels SP. A second insulating layer 139 is disposed under the data lines 138. The pixel electrodes 144 are disposed on a rear surface of the second insulating layer 139. Each of the pixel electrodes 144 corresponds in position to each sub-pixel SP. A liquid crystal layer 150 is interposed between the common electrode 118 and the pixel electrodes 144. A backlight device 160, which produces and emits artificial light toward the first and second substrates 110 and 130, is disposed adjacent to the rear surface of the first substrate 110.

Figure 6:
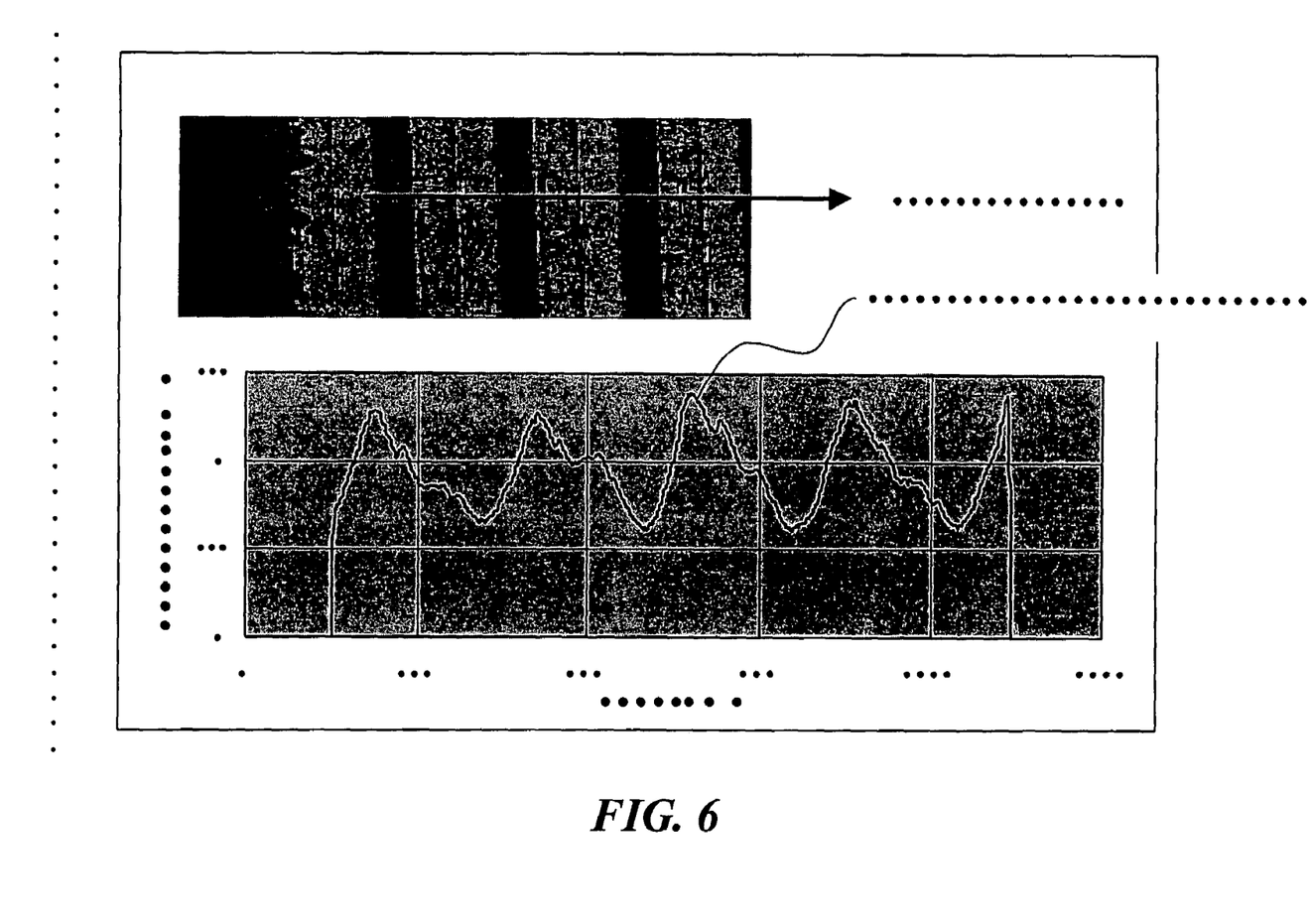
FIG. 6 is a graph showing the thickness difference of the cholesteric liquid crystal color filters according to the present invention.

FIG. 6 is a graph showing the thickness difference of the cholesteric liquid crystal color filters according to the present invention. As described before, there are 0.25 micrometers thickness difference between the green (G) and blue (B) CCFs, 0.25 micrometers thickness difference between the red (R) and green (G) CCFs, and 0.5 micrometers thickness difference between the red (R) and blue (B) CCFs. Therefore, each CCF layer may have the maximum difference of 0.5 micrometers because each CCF layer includes all of the R, G and B CCFs. However in the present invention, since only two CCFs are utilized in each CCF layer 112 or 114, the thickness difference may be reduced as much as 0.25 micrometers. Accordingly, the double-layered liquid crystal cholesteric color filter (CCF) layer 116 has an improved surface property, as shown in FIG. 6.

Figure 7:
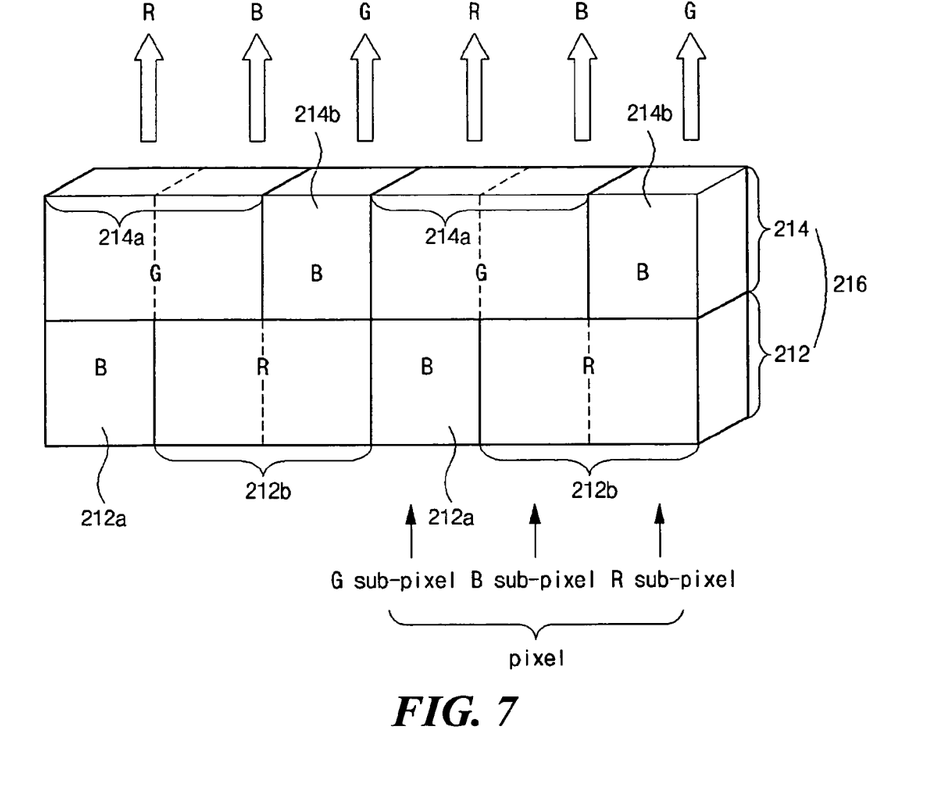
FIG. 7 shows a conceptual arrangement of the cholesteric liquid crystal color filters (CCFs) according to the present invention.

FIG. 7 shows a conceptual arrangement of the cholesteric liquid crystal color filters (CCFs) according to the present invention. As shown, a double-layered CCF layer 216 includes first and second CCF layer 212 and 214. The first CCF layer 212 includes blue (B) and red (R) CCFs 212*a* and 212*b* that have the ratio of 1:2 in size. The B and R CCFs 212*a* and 212*b* are alternately disposed in a repeated pattern. The second CCF layer 214 includes green (G) and blue (B) CCFs 214*a* and 214*b* that have the ratio of 2:1 in size. As being similar to the first CCF layer 212, the G and B CCFs 214a and 214b of the second CCF layer 214 are alternately disposed in a repeated pattern. In the present invention, the G CCF 214a overlaps both all of the B CCF 212a and a half portion of the R CCF 212b, and the B CCF 214b of the second CCF layer 214 overlaps the other half portion of the R CCF 212b.

When the backlight device (the reference 160 of FIG. 5) supplies light from the rear to the front, the sub-pixel having the combination of B and G produces a red (R) color because the B CCF 212a of the first CCF layer 212 transmits only red and green portions of the light and the G CCF 214a of the second CCF layer 214 transmits only the red portion of the light. In this manner, the sub-pixel having the combination of R and G produces a blue (B) color, and the sub-pixel having the combination of R and B produces a green (G) color. Therefore, the pixel having those three sub-pixels can produce the full range of colors of images.

According to the present invention, because each of the first and second CCF layers 212 and 214 only has two of the R, G and B CCFs, the color mixture in borders among the sub-pixels can be lessened. Furthermore, because the G and B CCFs that have a step of 0.25 micrometers in thickness are utilized for the second CCF layer 214, it is possible to reduce the thickness difference and the double-layered CCF layer 216 can have a smooth surface. As a result, the LCD device of the present invention does not have different cell gaps in the pixel, thereby preventing the retardation difference and producing excellent full colors.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates including a plurality of pixels, wherein each pixel divided into first to third sub-pixels;
   a double-layered cholesteric liquid crystal color filter (CCF) layer over the first substrate, the double-layered CCF layer including:
      a first CCF layer including first and second CCF with a ratio of 1:2 in size;
      a second CCF layer including third and fourth CCF with a ratio of 2:1 in size;
   a first transparent electrode on the double-layered CCF layer;
   a second transparent electrode on the second substrate;
   a liquid crystal layer between the first and second transparent electrodes; and
   a backlight device adjacent to the first substrate and emitting light toward the first and second substrates.

2. The device according to claim 1, wherein the first CCF layer is on the first substrate and the second CCF layer is disposed on the first CCF layer.

3. The device according to claim 1, wherein the first CCF occupies the first sub-pixel and the second CCF occupies the second and third sub-pixels.

4. The device according to claim 1, wherein the third CCF occupies the first and second sub-pixels and the fourth CCF occupies the third sub-pixels.

5. The device according to claim 1, wherein third CCF overlaps all the first CCF and half of the second CCF, and the fourth CCF overlaps the other half portion of the second CCF.

6. The device according to claim 1, wherein the first and second CCFs are alternately arranged in the first CCF layer in a repeated pattern.

7. The device according to claim 1, wherein the third and fourth CCFs are alternately arranged in the second CCF layer in a repeated pattern.

8. The device according to claim 1, wherein the first CCF reflects a blue portion of the light and transmits the green and red portions of the light.

9. The device according to claim 8, wherein the third CCF reflects the green portion of the light and transmits the red portion of the light.

10. The device according to claim 1, wherein the second CCF reflects a red portion of the light and transmits blue and green portions of the light.

11. The device according to claim 10, wherein the third CCF reflects the green portion of the light and transmits the blue portion of the light.

12. The device according to claim 10, wherein the fourth CCF reflects the blue portion of the light and transmits the green portion of the light.

13. The device according to claim 1, wherein the first sub-pixel has a combination of blue and green cholesteric liquid crystal color filters (CCFs), and the combination transmits a red portion of the artificial light.

14. The device according to claim 1, wherein the second sub-pixel has a combination of red and green cholesteric liquid crystal color filters (CCFs), and the combination transmits a blue portion of the artificial light.

15. The device according to claim 1, wherein the third sub-pixel has a combination of red and blue cholesteric liquid crystal color filters (CCFs), and the combination transmits a green portion of the artificial light.

16. The device according to claim 1, further comprising:
   a first insulating layer on the second substrate;
   gate and data lines on the second substrate, wherein the data lines are disposed underneath the first insulating layer, and wherein the gate and data lines define the sub-pixels; and
   a second insulating layer between the data lines and the second transparent electrode.

17. The device according to claim 16, further comprising a thin film transistor near each crossing of the gate and data lines.

18. The device according to claim 17, wherein the thin film transistor includes a gate electrode, an active layer, a source electrode and a drain electrode.

* * * * *